US012404897B2

(12) United States Patent
Nußbaumer et al.

(10) Patent No.: US 12,404,897 B2
(45) Date of Patent: Sep. 2, 2025

(54) APPARATUS, RAIL GUIDE AND ITEM OF FURNITURE

(71) Applicant: GRASS GMBH, Höchst (AT)

(72) Inventors: Thomas Nußbaumer, Lingenau (AT); Melanie Metzler, Wolfurt (AT); Tim Lucas, Leinfelden-Echterdingen (DE); Luca Michieli, Taiedo di Chinos (IT)

(73) Assignee: Grass GmbH, Hoechst (AT)

( * ) Notice: Subject to any disclaimer, the term of this patent is extended or adjusted under 35 U.S.C. 154(b) by 0 days.

(21) Appl. No.: 18/922,580

(22) Filed: Oct. 22, 2024

(65) Prior Publication Data

US 2025/0043820 A1    Feb. 6, 2025

Related U.S. Application Data

(63) Continuation of application No. PCT/EP2024/060225, filed on Apr. 16, 2024.

(30) Foreign Application Priority Data

Apr. 24, 2023    (DE) ..................... 10 2023 110 403.9

(51) Int. Cl.
A47B 88/45    (2017.01)
F16C 29/02    (2006.01)
F16C 29/10    (2006.01)

(52) U.S. Cl.
CPC .............. *F16C 29/02* (2013.01); *A47B 88/45* (2017.01); *F16C 29/10* (2013.01); *F16C 2314/72* (2013.01)

(58) Field of Classification Search
CPC .......... A47B 88/45; F16C 29/02; F16C 29/10; F16C 2314/72

(Continued)

(56) References Cited

U.S. PATENT DOCUMENTS 4,600,254 A * 7/1986 Whalen ................. E06B 3/5045
    312/139.2
8,950,833 B2 * 2/2015 Bohle .................... E05D 15/463
    312/331

(Continued)

FOREIGN PATENT DOCUMENTS

AT    509 257 B1    9/2013
DE    20 2010 010 085 U1    12/2011

(Continued)

OTHER PUBLICATIONS

German Search Report (Application No. 10 2023 110 403.9) dated Dec. 22, 2023 (8 pages).

(Continued)

*Primary Examiner* — James O Hansen
(74) *Attorney, Agent, or Firm* — BURR PATENT LAW, PLLC

(57) ABSTRACT

An apparatus for controlling the movement of two guide units having a first and second ejection units, including a synchronization device having a connection element which connects together and synchronizes the first and second ejection units. Each ejection unit has an adapter member that provides a receiving portion having a receiving volume in which the end portion of the connection element can be accommodated. The receiving volume is surrounded over a partial circumference by a fixed wall of the adapter member, and over a remaining circumferential portion with respect to the partial circumference a closure portion of the adapter member is provided. The closure portion is pivotably articulated to the adapter member and can be pivoted from an open position reversibly into a secured closure position of the closure portion, wherein in the closure position of the closure portion the remaining circumferential portion is closed.

12 Claims, 5 Drawing Sheets

(58) Field of Classification Search
USPC .......................................................... 312/331
See application file for complete search history.

(56) References Cited

U.S. PATENT DOCUMENTS

| | | | |
|---|---|---|---|
| 10,172,459 B2* | 1/2019 | Chen | A47B 88/463 |
| 2012/0181909 A1* | 7/2012 | Isele | E05D 15/463 |
| | | | 312/298 |
| 2012/0237144 A1 | 9/2012 | Gasser | |
| 2013/0307390 A1 | 11/2013 | Bohle | |
| 2013/0328468 A1 | 12/2013 | Schneider et al. | |
| 2014/0060991 A1* | 3/2014 | Bohle | A47B 88/40 |
| | | | 192/56.1 |
| 2017/0164737 A1 | 6/2017 | Albrecht et al. | |
| 2022/0015537 A1 | 1/2022 | Janser | |

FOREIGN PATENT DOCUMENTS

| | | |
|---|---|---|
| DE | 10 2012 112 157 A1 | 5/2014 |
| DE | 20 2015 106 773 U1 | 4/2017 |
| EP | 2 644 052 B1 | 5/2015 |
| WO | 2020/186276 A1 | 9/2020 |

OTHER PUBLICATIONS

International Search Report and Written Opinion (Application No. PCT/EP2024/060225) dated Jul. 11, 2024 (11 pages).
English translation of Written Opinion of the International Searching Authority (WO/ISA) (Application No. PCT/EP2024/060225) dated Jul. 11, 2024 (3 pages).

* cited by examiner

APPARATUS, RAIL GUIDE AND ITEM OF FURNITURE

CROSS REFERENCE TO RELATED APPLICATIONS

This application is a continuation of International Application No. PCT/EP2024/060225 filed Apr. 16, 2024, which designated the United States, and claims the benefit under 35 USC § 119(a)-(d) of German Application No. 10 2023 110 403.9 filed Apr. 24, 2023, the entireties of which are incorporated herein by reference.

FIELD OF THE INVENTION

The present invention relates to an apparatus, rail guide and item of furniture.

BACKGROUND OF THE INVENTION

Apparatuses for controlling the movement of two rail guides for furniture portions are known. Such apparatuses control two rail guides such as two partial pull-out members or two complete pull-out members. For example, movement control apparatuses are used for a force-assisted and/or damped movement of the respective movement rails of the two partial or complete pull-out members. Accordingly, the movement of the furniture portion relative to a furniture carcass to which the furniture portion is fitted via the two rail guides is influenced. For example, such furniture portions are linearly movable furniture portions, such as drawers, which are movably received on the furniture carcass via the two identical rail guides.

SUMMARY OF THE INVENTION

An object of the present invention is in the field of furniture to provide alternatives for controlling the movement of two rail guides, in particular, an apparatus for controlling the movement of two rail guides, which is improved with regard to the assembly and/or the mounting on the furniture portion.

The present invention is based on an apparatus for controlling the movement of two guide units, wherein the two guide units in each case comprise a fixed rail and a movement rail which can be displaced relative to the fixed rail, wherein the apparatus comprises a first ejection unit and a second ejection unit which can be arranged in each case on an associated guide unit and which are spaced apart from each other, wherein a synchronization device having a connection element is provided, wherein the connection element is a separate component which connects the first ejection unit and the second ejection unit to each other in order to synchronize the two ejection units, wherein the two ejection units are configured in an identical manner, and wherein each ejection unit has an adapter member, on which a respective end portion of the connection element can be releasably fitted.

For example, the connection element is in the form of a synchronization rod. For example, a maximum outer diameter of the connection element is smaller than a, for example, mean outer diameter of the adapter member or smaller than, for example, a maximum outer diameter of the adapter member.

For example, the adapter member is received on the ejection unit so as to be able to be rotated in both possible rotation directions. For example, the rotation axis of the adapter member is orientated transversely relative to the linear displacement direction of the sliding member with respect to the base component.

For example, the ejection units are configured to act simultaneously for a furniture portion, for example, additionally as drawer opening apparatuses.

For example, an ejection unit comprises the adapter element, a base component, a sliding member, an energy store, a locking member, a heart-like curve and a catch member.

For example, the base component comprises a connection housing which can, for example, be releasably connected to the remaining base component. For example, the connection housing comprises a fitting portion for the adapter member. For example, the locking member is received, for example, supported, on the connection housing. A bent wire component is, for example, received on the connection housing or on the remaining base component. For example, the wire component comprises the locking member, for example, as a bent end of the wire component. For example, another bent end of the wire component is securely but, for example, releasably fitted to a bearing location on the base component.

For example, the locking member is in the form of an end portion of a wire component. For example, the locking member is in the form of a portion of a resiliently deformable wire element. For example, the locking member is in the form of a portion of a wire element, wherein the wire element comprises a linear portion and a bent portion which are connected to each other, for example, in an integral manner.

For example, the position of the connection housing relative to the base component can be adjusted. For example, the position of the connection housing relative to the base component can be adjusted in the closure direction and/or in the opening direction. For example, the position of the connection housing relative to the base component can be adjusted in a stepless manner, for example, adjusted in a stepless manner in the closure direction and/or in the opening direction. For example, the position of the connection housing relative to the base component can be adjusted manually or without a tool, for example, by rotating a knurled screw which is, for example, rotatably received on the base component.

A guiding unit which is in the form of a partial pull-out member comprises a fixed rail which can be connected to a furniture carcass and a movement rail which can be coupled to the furniture portion. For example, the fixed rail and the movement rail can be displaced with respect to each other in the manner of a telescope.

In the case of a complete pull-out member, a middle rail is provided between the fixed rail and the movement rail. For example, the fixed rail, the middle rail and the movement rail can be displaced relative to each other in the manner of a telescope.

Generally, the rails of a guide unit, a partial pull-out member or a complete pull-out member can be displaced relative to each other by means of bearing arrangements, for example, comprising roller member bearing mechanisms, such as, for example, ball and/or roller bearing members. The bearing arrangements act between adjacent rails of the guide unit.

For example, in items of furniture with comparatively large fronts, such as, for example, with comparatively wide drawers which are guided on a furniture carcass by means of two guide units and which are opened by means of a touch latch functionality, for example, a synchronous touch latch activation is configured. Accordingly, the locking position of the apparatus can be cancelled by means of a movement of the sliding member in the closure direction.

The notion of the present invention is that the adapter member provides a receiving portion having a receiving volume in which the end portion of the connection element can be accommodated in a state fixed in position relative to the adapter member, and wherein the receiving volume with respect to the fitted end portion of the connection element is surrounded over a partial circumference with respect to a longitudinal axis of the end portion of the connection element by a fixed wall of the adapter member and over a remaining circumferential portion with respect to the partial circumference a closure portion of the adapter member is provided, wherein the fitted end portion of the connection element moves into abutment with the fixed wall, and wherein the closure portion is pivotably articulated to the adapter member and can be pivoted from an open position of the closure portion on the adapter member, in which the receiving volume is open over the remaining circumferential portion for introducing the end portion of the connection element, reversibly into a secured closure position of the closure portion wherein in the closure position of the closure portion the remaining circumferential portion is closed.

This represents an easy-to-assemble solution. Previously, in an unfavorable manner or under difficult assembly conditions, for example, an axial introduction of the end portions of the connection element on the respective ejection unit had to be carried out.

The movement rail which can be coupled to a furniture portion can, for example, be linearly displaced in an opening direction and in a closure direction relative to the fixed rail. For example, the apparatus in the arranged state on the guide unit is configured for a force-supported displacement of the movement rail from a closure position of the movement rail in the opening direction.

For example, the respective ejection unit comprises an energy store, a base component and a sliding member which can be displaced relative to the base component, wherein the sliding member under the action of the charged energy store can be moved in the opening direction and, in the assembled state of the apparatus on the guide unit, also carries the movement rail in the opening direction.

For example, the apparatus comprises a locking arrangement having a heart-like curve slotted guiding member and a locking member which can be brought into abutment along the heart-like curve. For example, when the energy store is charged in a locking position of the apparatus, the sliding member assumes a blocked position, wherein a displacement of the sliding member in the opening direction is blocked.

For example, the connection element connects the two sliding members of the two apparatuses to each other in such a manner that a synchronized cancellation of the blocked position of the sliding member of one ejection unit and the sliding member of the other ejection unit is carried out.

For example, a linear movement of the sliding member and a rotational movement of the connection element occur about its longitudinal axis in a mechanically coupled manner by means of the connection element. For example, the sliding member and a gear contour are securely or rigidly, for example, integrally connected to each other, for example, formed on a sliding member component. For example, the gear mechanism contour of the sliding member can be moved in a linear manner, for example, moved together with the remaining sliding member linearly back and forth, for example, in a displaceable or movable manner. For example, the linear sliding member movement is temporarily coupled to a linear movement of the furniture portion.

For example, the adapter member is configured in an integral manner. This enables an advantageous production of the adapter member. For example, the adapter member comprises a plastics material. For example, the adapter member is an injection-molded plastics component. For example, the adapter member alternatively comprises a metal material.

For example, the closure portion of the adapter member is connected to the remaining portion of the adapter member by means of a film hinge. A film hinge can be produced in a simple manner. For example, the film hinge is configured integrally with the closure portion and the remaining portion of the adapter member. A film hinge is durable and robust. For example, a movability, such as, for example, a flexibility of the film hinge, can be influenced by means of a predeterminable thickness of the material which forms the film hinge and/or the material properties of the plastics material which the film hinge comprises. For example, consequently, a pretensioning of the closed film hinge in the closed position can also be predetermined.

For example, the adapter member has locking mechanisms, by way of which the closure portion can be secured in the closure position of the closure portion. For example, a portion of the locking mechanism on the closure portion and another portion of the locking mechanism on a counter-portion on the remaining portion of the adapter member are provided. For example, the locking mechanism can be moved into the closure position by means of a movement of the closure portion in the direction of the other portion of the locking mechanism. For example, the closure portion can be locked independently in the closure position. For example, the locking mechanisms can be manually released from the locked position.

For example, the closure portion can be hooked to the locking mechanism on the adapter member in the closure position of the closure portion. For example, part-regions of the locking mechanism can be resiliently moved, for example, redirected.

For example, the locking mechanisms are configured to form a snap-fit closure. For example, the locking mechanisms comprise an undercut on the closure portion and/or an undercut on the remaining portion of the adapter member. For example, the locking mechanisms have a tooth portion which in the closure position is retained on, for example, in a manner engaging behind, a locking edge. For example, the retention is brought about as a result of a restoring force which is provided by the resilient property of the film hinge and/or part-regions of the locking mechanisms.

For example, the outer form of the end portion of the connection element and the inner form of the receiving portion are configured to be adapted to each other. Consequently, a secure connection of the end portion of the connection element to the adapter member is enabled, for example, by means of a surface pressure of portions which can be brought into planar abutment with each other.

For example, the outer form of the end portion of the connection element and the inner form of the receiving portion are configured in such a manner that in the closure position of the closure portion there is a positive-locking connection between the end portion of the connection element and the adapter member. For example, an outer form of the end portion of the connection element comprises an outwardly curved portion, wherein the outwardly curved portion and a recessed configuration of the inner form of the receiving portion are adapted to each other in such a manner that the end portion of the connection element and the inner form of the receiving portion, for example, a fixed wall of the inner form, move into abutment with each other, in a precisely fitting manner, for example, in a gap-free manner or with a comparatively small gap, for example, in a virtually gap-free manner.

For example, a tooth contour portion of the adapter member is provided, wherein the tooth contour portion is configured to be axially offset with respect to the receiving portion. The term "axially offset" relates to a longitudinal axis of the connection element connected in an inserted manner. For example, the tooth contour portion is in the form of a pinion portion, for example, the tooth contour portion is in the form of a regularly configured outer tooth contour. For example, a maximum outer diameter of the tooth contour portion is identical to or smaller than an outer diameter of the adapter member in the region of the receiving portion.

For example, both adapter members on the respective ejection apparatus are configured identically. This is easy to assemble and economically advantageous. For example, both adapter members are identical.

For example, the end portion of the connection element is formed externally in the basic form in a cylindrical manner with a fitting contour which extends in the longitudinal direction of the connection element. For example, the connection element has a uniform structure over the entire extent thereof or over the entire length thereof, comprising the two end portions and the remaining portion which is provided therebetween. Consequently, an initial component which forms the connection element can be cut freely to a desired length.

For example, the fitting contour is configured so as to protrude outward in a linear form on a basic form of the connection element, wherein the basic form of the connection element is, for example, cylindrical or is a cylinder-like form.

For example, the fitting contour has two projections which are radially opposite each other with respect to the longitudinal axis. For example, the projections relate to a, for example, cylindrical outer basic shape of the connection element.

For example, the fitting contour has two diametrically opposed outer projections which extend in parallel and which protrude outward and which are, for example, bead-like or outwardly convex.

For example, the two opposing projections are configured in an identical manner, for example, formed continuously in the longitudinal direction on the connection element.

For example, the closure portion has an abutment contour which can be brought into abutment with the connection element and which is adapted to the outer contour of the connection element for fitting abutment in the closure position of the closure portion. Consequently, the connection element can be connected to the adapter member in a rotationally secure manner.

For example, there is proposed a rail guide which comprises two guide units each having a fixed rail which can be connected to a furniture carcass and a movement rail which can be coupled to a furniture portion, wherein an apparatus according to one of the above-described embodiments is provided.

For example, an item of furniture having a furniture carcass and a movable furniture portion is proposed, wherein a rail guide as mentioned above is provided.

BRIEF DESCRIPTION OF THE DRAWINGS

Other features and advantages of the present invention are explained in greater detail with reference to schematically illustrated exemplary embodiments.

DETAILED DESCRIPTION OF THE INVENTION

Figure 1:
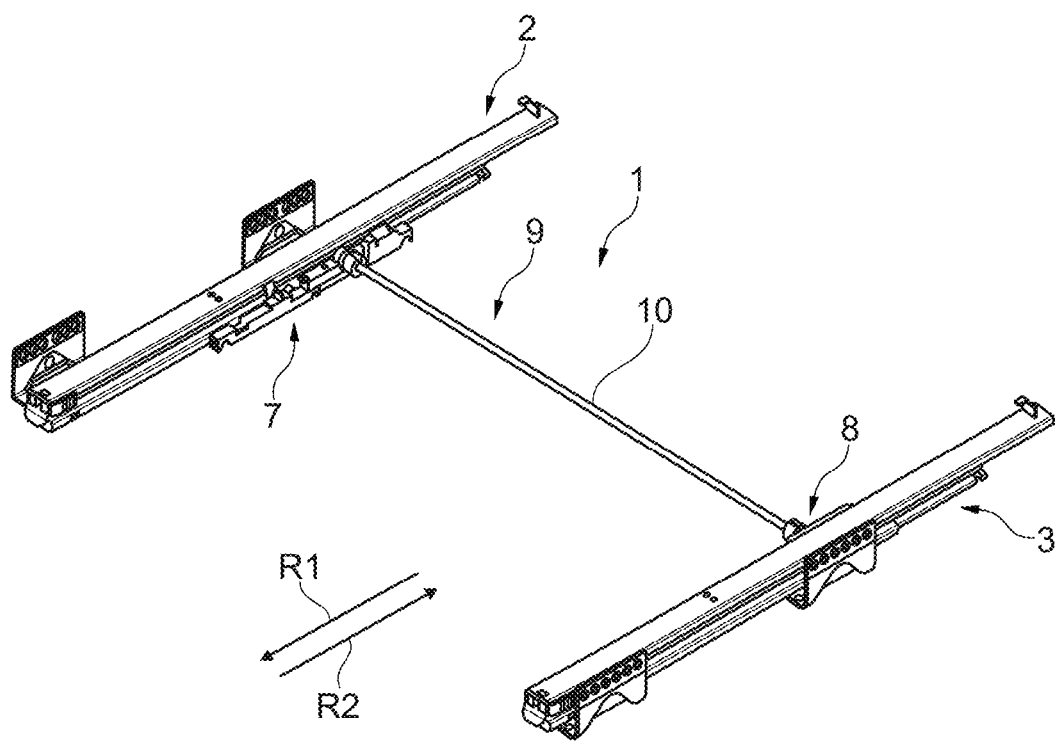
FIG. 1 shows a rail guide with two guide units to which an ejection unit is fitted as a perspective view.
Figure 2:
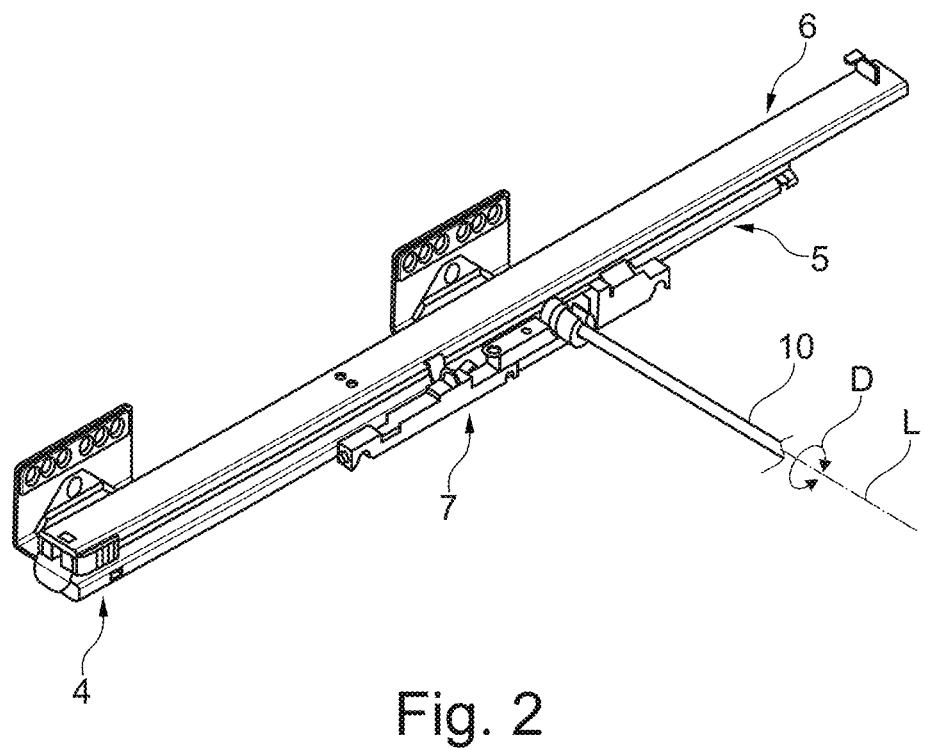
FIG. 2 shows an enlarged cut-out from FIG. 1.
Figure 3:
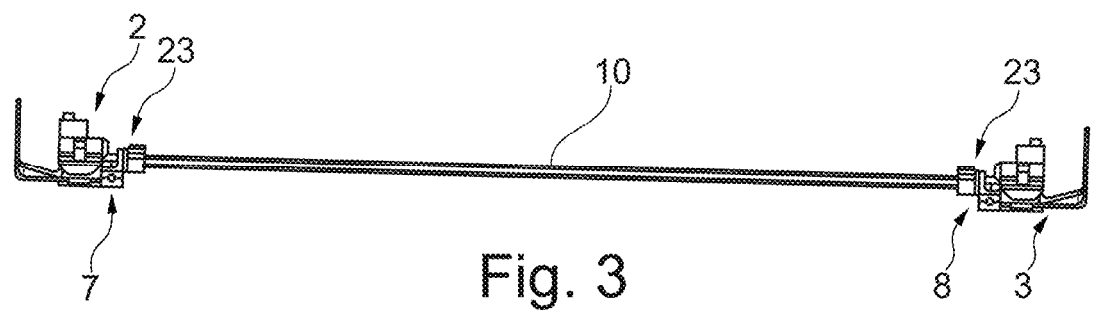
FIG. 3 shows the arrangement from FIG. 1 as a front view.
Figure 4:
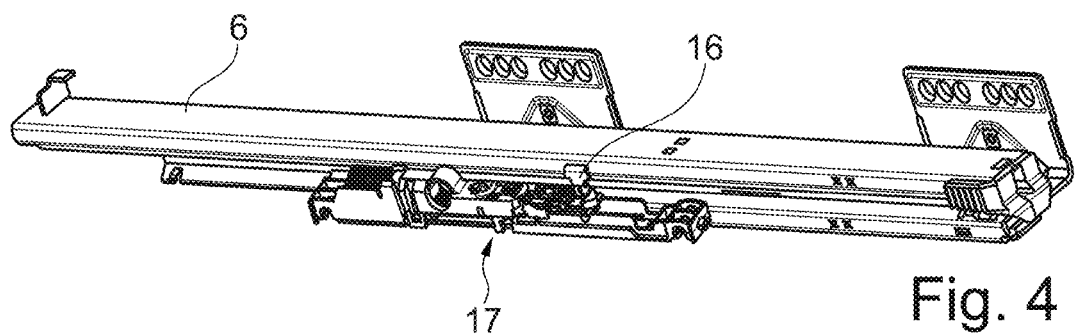
FIG. 4 shows a guide unit having an ejection unit according to the arrangement from FIG. 1 as a perspective view.

For corresponding elements of different exemplary embodiments, the same reference numerals are sometimes used.

FIG. 1 shows a rail guide 1 having two ejection units 7 and 8 for two guide units 2 and 3 which are in each case in the form of a complete pull-out member with a fixed rail 4, a middle rail 5 and a movement rail 6. The ejection units comprise a first, for example, right ejection unit 7 for controlling the movement of the right guide unit 2 and a second, for example, left ejection unit 8 for controlling the movement of the left guide unit 3. A synchronization device 9 comprises a connection element 10 which connects the ejection units 7 and 8.

The two guide units 2 and 3 are used to guide the linear movement of a drawer on a furniture carcass of an item of furniture which is not illustrated. Accordingly, the movement rail 6 can be displaced in a linear manner relative to the fixed rail 4 which can be positioned securely on the furniture carcass in an opening direction R1 and in a closure direction R2.

Figure 5:
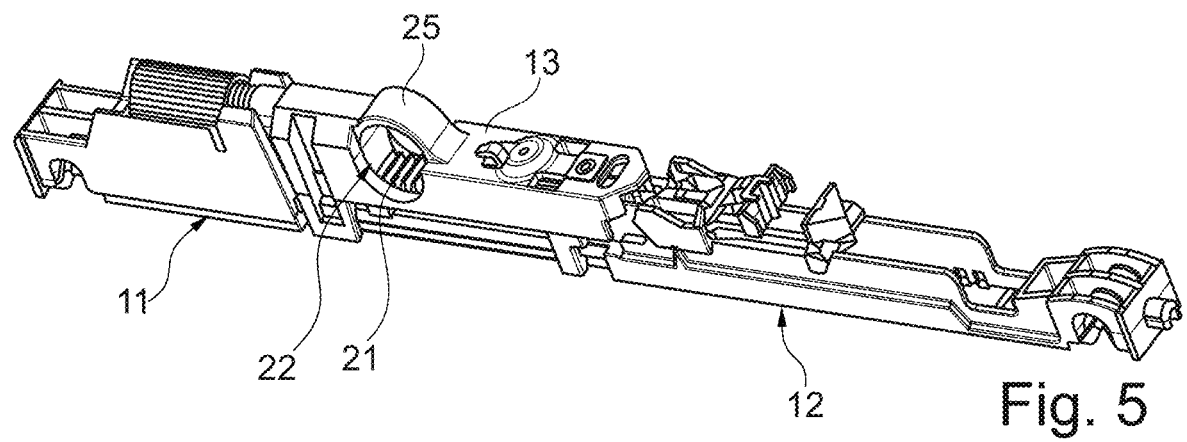
FIG. 5 shows the ejection unit shown in FIG. 4 in an enlarged state.
Figure 6:
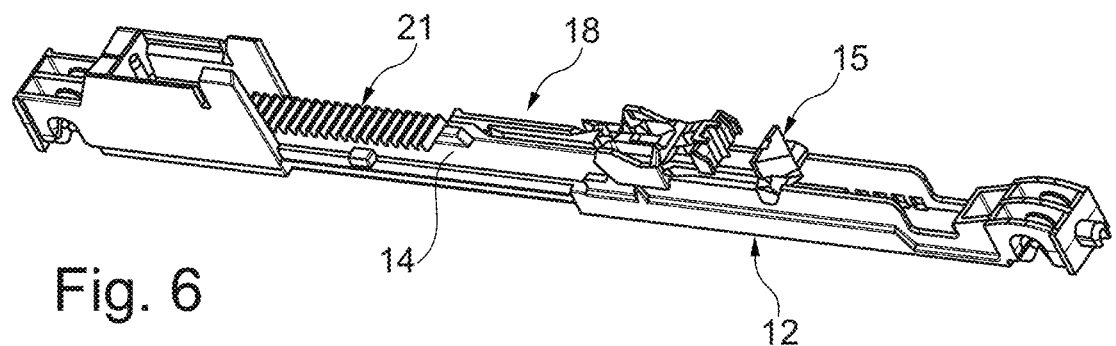
FIG. 6 shows the ejection unit shown in FIG. 5 without a connection housing.
Figure 7:
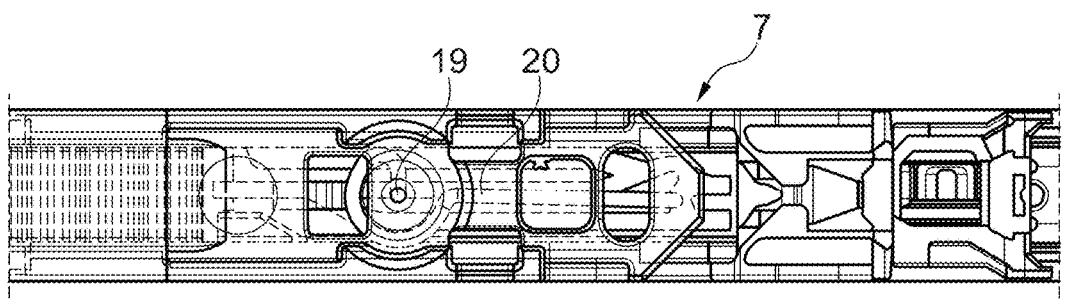
FIG. 7 shows a cut-out of the ejection unit according to FIG. 5 from above with a transparently depicted cover of the ejection unit.
Figure 8:
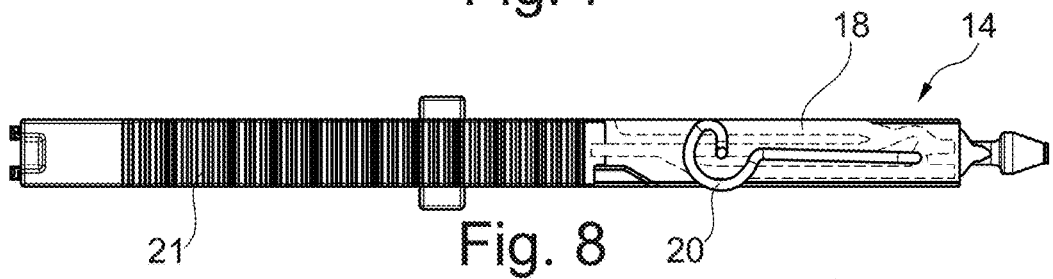
FIG. 8 shows a view from above of a sliding member of the ejection unit according to FIG. 5 with a locking component comprising a locking member.
Figure 9:
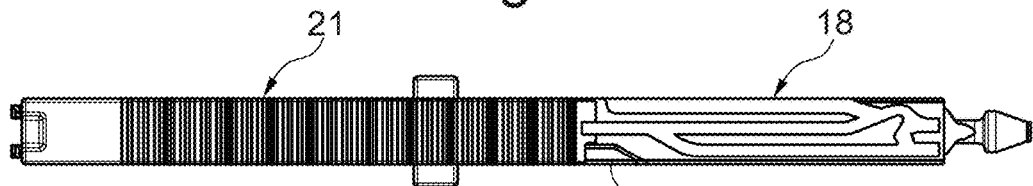
FIG. 9 shows the arrangement according to FIG. 8 without the locking component.

The ejection units 7 and 8 comprise in each case an energy store 11 (FIG. 5), a base component 12 having a connection housing 13, a sliding member 14 which can be displaced relative to the base component 12 and on which a catch member 15 which cooperates with a carrier 16 on the movement rail 6 is provided.

Figure 10:
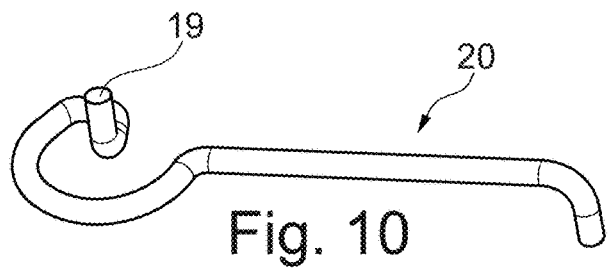
FIG. 10 shows the locking component from FIG. 8 comprising the locking member, alone as a perspective view.

The ejection units 7, 8 comprise a locking arrangement 17 having a heart-like curve 18 and a locking member 19 which can be moved along the heart-like curve 18 into abutment and which is provided on a locking component 20 (see FIG. 10).

The sliding member 14 has a gear mechanism contour 21 for geared movement coupling of the linear movement of the sliding member 14 and a rotational movement D of the connection element 10 about a longitudinal axis L of the connection element 10.

Figure 11:
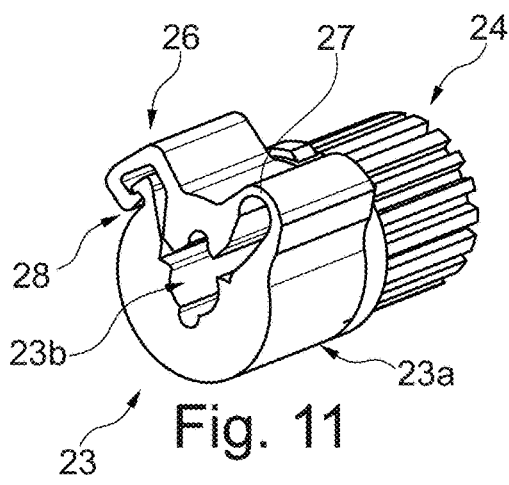
FIG. 11 shows a perspective illustration of an adapter member according to the rail guide from FIGS. 1-3.
Figure 12:
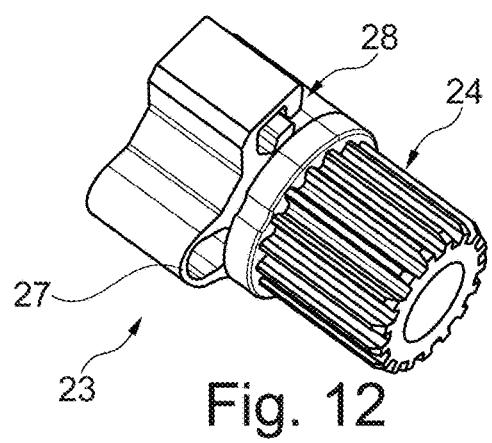
FIG. 12 shows the adapter member according to FIG. 11 as another perspective illustration.

A receiving member 22 of the ejection unit 7, 8 is configured to accommodate an adapter member 23 (see FIGS. 11, 12). The adapter member 23 has a receiving portion 23*a* having a receiving volume 23*b*.

A tooth contour portion 24 is formed on the adapter member 23. The tooth contour portion 24 meshes with the gear mechanism contour 21. The adapter member 23 enables a releasable fitting of an end portion of the connection element 10.

The portion of the adapter member 23 adjacent to the tooth contour portion 24 has a closure portion 26 which, by means of a film hinge 27, such as, for example, an articulation, can be pivoted relative to the remaining adapter member 23. The closure portion 26 can be engaged with the end thereof remote from the film hinge 27 by way of locking means 28, in order to lock the closure portion 26 in the closure position thereof according to the illustration in FIGS. 11 and 12, but in a state illustrated without the connection element 10 in order to secure a connection element 10 which is inserted.

The receiving member 22 has a wall 25 which is configured circumferentially with respect to the introduced connection element 10.

The ejection units 7 and 8 act as ejection apparatuses on which the synchronization device 9 can be arranged in each case with the adapter member 23 and the connection element 10.

Figure 13:
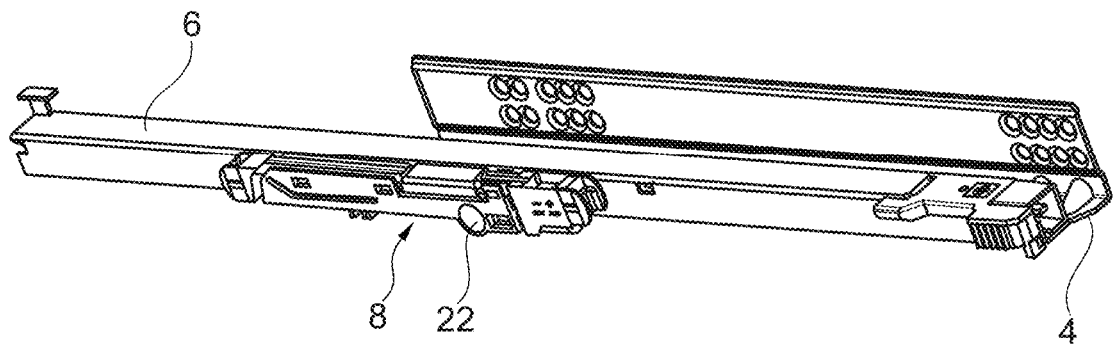
FIG. 13 shows another guide unit and a portion of an alternative ejection unit as an illustration according to FIG. 4.
Figure 14:
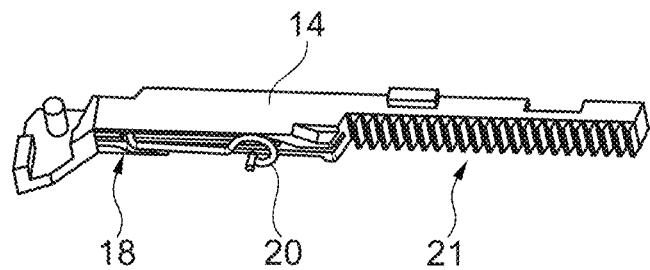
FIG. 14 shows a sliding member of the ejection unit according to FIG. 13 in an enlarged state as a perspective view.
Figure 15:
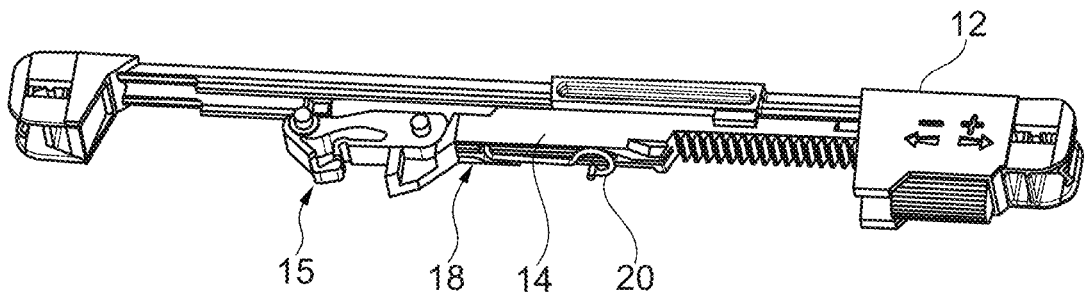
FIG. 15 shows a portion of the ejection unit from FIG. 13 without a connection housing.
Figure 16:
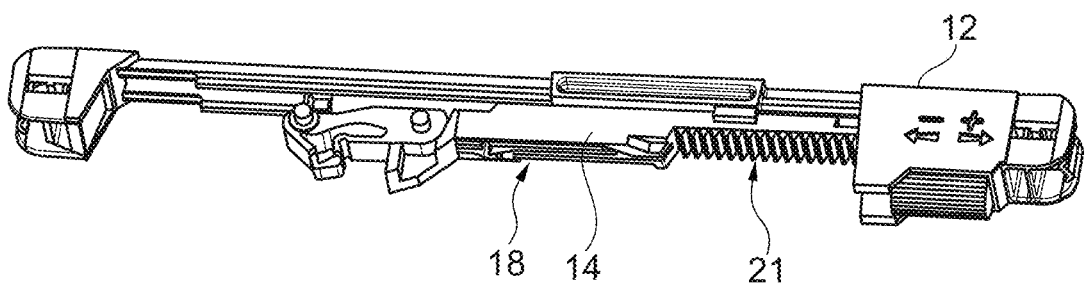
FIG. 16 shows the arrangement according to FIG. 15 without a locking component.
Figure 17:
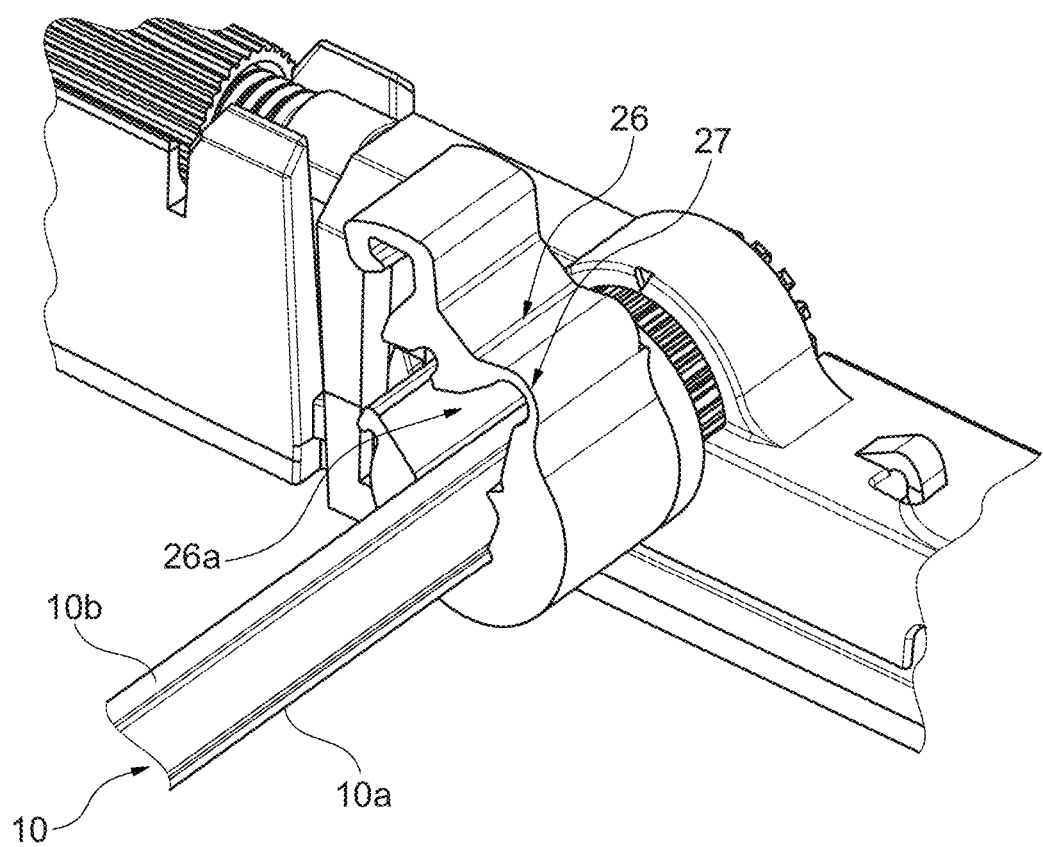
FIG. 17 shows an enlarged cut-out of the arrangement according to FIG. 2.

In the ejection unit 8 for a guide unit which is in the form of a partial pull-out member according to FIG. 13 having a fixed rail 4 and a movement rail 6, a heart-like curve 18 in the state for use on the item of furniture is orientated to face downward or is open in a downward direction or orientated in a downward direction, as seen in FIGS. 14-16.

The ejection unit 8 has the same operating method as the ejection unit 7 or 8 for the guide unit 2 and 3 which is in each case in the form of a complete pull-out member. The ejection unit 8 which is configured for the guide unit which is in the form of a partial pull-out member according to FIG. 13 is or can be arranged on the movement rail 6. The carrier which cannot be seen in FIG. 13 and which cooperates with the catch member 5 is provided on the fixed rail 4.

FIG. 16 does not show a locking component 20 of the ejection unit 8.

FIGS. 15 and 16 do not show a connection housing 13 of the ejection unit 8.

For example, the outer shape of the connection element 10 has a fitting contour having two projections 10*a*, 10*b* which are radially opposite each other with respect to the longitudinal axis of the connection element 10.

For example, the closure portion 26 has an abutment contour 26*a* which can be brought into abutment with the connection element and which is adapted to the outer contour of the connection element 10 for fitting abutment in the closure position of the closure portion 26 against the connection element 10. For example, the abutment contour 26*a* is in close abutment with a projection 10*b* and with adjacent portions of the outer contour of the connection element 10 at both sides.

LIST OF REFERENCE NUMERALS

1 Rail guide
2 Guide unit
3 Guide unit
4 Fixed rail
5 Middle rail
6 Movement rail
7 Ejection unit
8 Ejection unit
9 Synchronization device
10 Connection element
10*a* Projection
10*b* Projection
11 Energy store
12 Base component
13 Connection housing
14 Sliding member
15 Catch member
16 Carrier
17 Locking arrangement
18 Heart-like curve
19 Locking member
20 Locking component
21 Gear mechanism contour
22 Receiving member
23 Adapter member
23*a* Receiving portion
23*b* Receiving volume
24 Tooth contour portion
25 Wall
26 Closure portion
26*a* Abutment contour
27 Film hinge
28 Locking mechanism

The invention claimed is:

1. An apparatus for controlling the movement of two guide units, each of the two guide units comprising a fixed rail and a movement rail which can be displaced relative to the fixed rail, wherein the apparatus comprises:
  a first ejection unit and a second ejection unit, each of which can be arranged on a respective one of the two guide units and which are spaced apart from each other; and
  a synchronization device having a connection element,
  wherein the connection element is a separate component connecting the first ejection unit and the second ejection unit to each other to synchronize the first and second ejection units, wherein the first and second ejection units are configured in an identical manner,
  wherein each of the first and second ejection units has an adapter member, on which a respective end portion of the respective connection element can be releasably fitted,
  wherein the adapter member includes a receiving portion having a receiving volume in which the fitted end portion of the connection element is accommodated in a fixed position relative to the adapter member, wherein the receiving volume accommodating the fitted end portion of the connection element is surrounded over a partial circumference with respect to a longitudinal axis of the end portion of the connection element by a fixed wall of the adapter member and a closure portion of the adapter member is provided over a remaining circumferential portion with respect to the partial circumference, wherein the fitted end portion of the connection element moves into abutment with the fixed wall, and wherein the closure portion is pivotably articulated to the adapter member and pivotable from an open position of the closure portion on the adapter member, in which the receiving volume is open over the remaining circumferential portion for introducing the end portion of the connection element, reversibly into a secured closure position of the closure portion, wherein in the secured closure position of the closure portion, the remaining circumferential portion is closed.

2. The apparatus as claimed in claim 1, wherein the adapter member is configured in an integral manner.

3. The apparatus as claimed in claim 1, wherein the closure portion of the adapter member is connected to the remaining portion of the adapter member by a film hinge.

4. The apparatus as claimed in claim 1, wherein the adapter member comprises a locking mechanism, by way of which the closure portion is secured in the secured closure position of the closure portion.

5. The apparatus as claimed in claim 1, wherein an outer form of the end portion of the connection element and an inner form of the receiving portion are configured to be adapted to each other.

6. The apparatus as claimed in claim 1, further comprising a tooth contour portion of the adapter member,
wherein the tooth contour portion is axially offset with respect to the receiving portion.

7. The apparatus as claimed in claim 1, wherein each of the adapter members on the respective first and second ejection units are configured identically.

8. The apparatus as claimed in claim 1, wherein the end portion of the connection element is formed externally in a cylindrical manner having an outer contour shape which extends in the longitudinal direction of the connection element.

9. The apparatus as claimed in claim 8, wherein the outer contour shape of the connection element includes two projections which are radially opposite each other with respect to the longitudinal axis of the connection element.

10. The apparatus as claimed in claim 1, wherein the closure portion has an abutment contour which can be brought into abutment with the connection element and which is adapted to an outer contour shape of the connection element to provide a fitting abutment in the secured closure position of the closure portion.

11. A rail guide comprising two guide units, each having a fixed rail which can be connected to a furniture body and a movement rail which can be coupled to a furniture portion, and the apparatus as claimed in claim 1.

12. An item of furniture comprising the furniture body, a movable furniture portion, and the rail guide as claimed in claim 11.

* * * * *